Oct. 4, 1932.   A. R. McMULLIN   1,881,323
POWER MECHANISM FOR OPERATING BUCKETS OF CENTRIFUGAL MOLDING APPARATUS
Filed Dec. 31, 1931   5 Sheets-Sheet 1
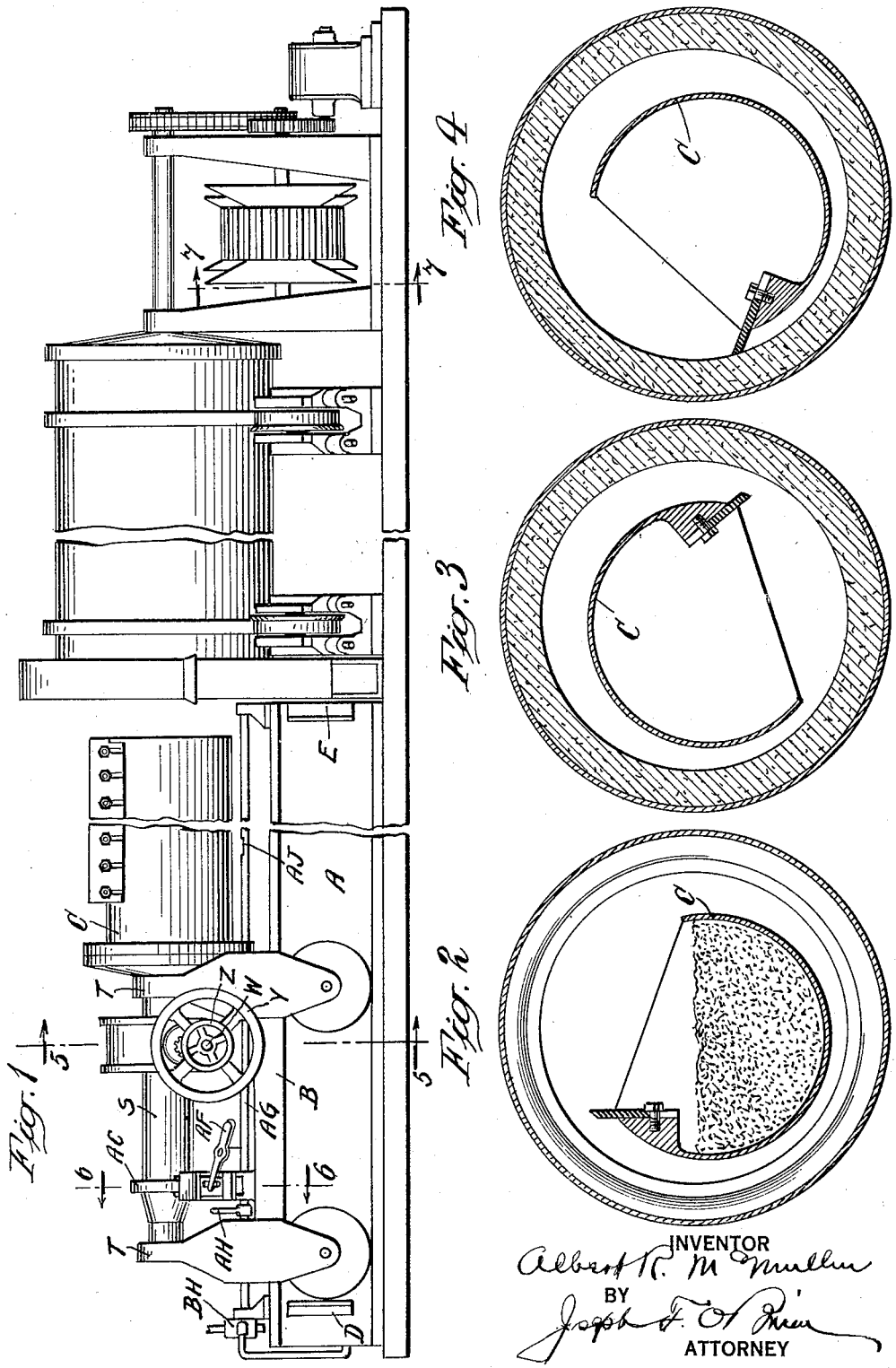

Oct. 4, 1932.  A. R. McMULLIN  1,881,323
POWER MECHANISM FOR OPERATING BUCKETS OF CENTRIFUGAL MOLDING APPARATUS
Filed Dec. 31, 1931  5 Sheets-Sheet 2
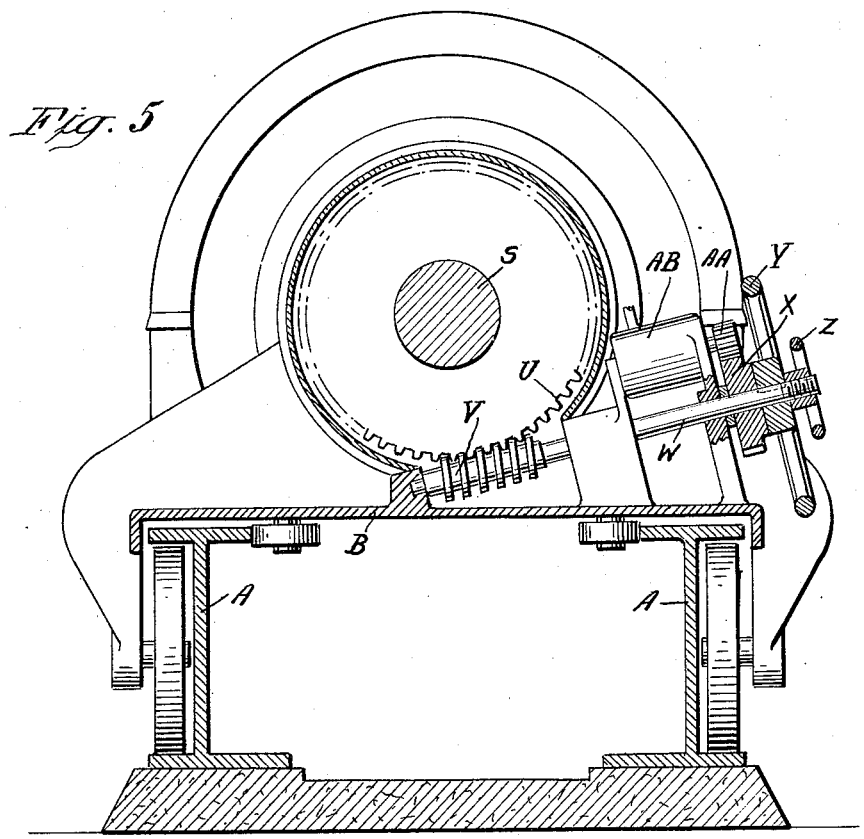
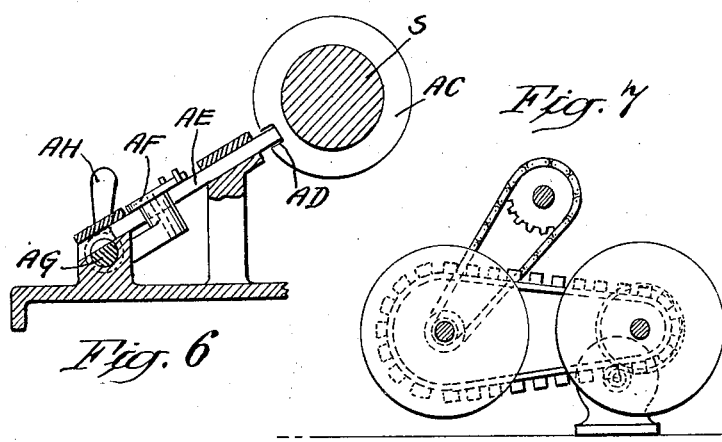
INVENTOR
Albert R. McMullin
BY
Joseph F. O'Brien
ATTORNEY

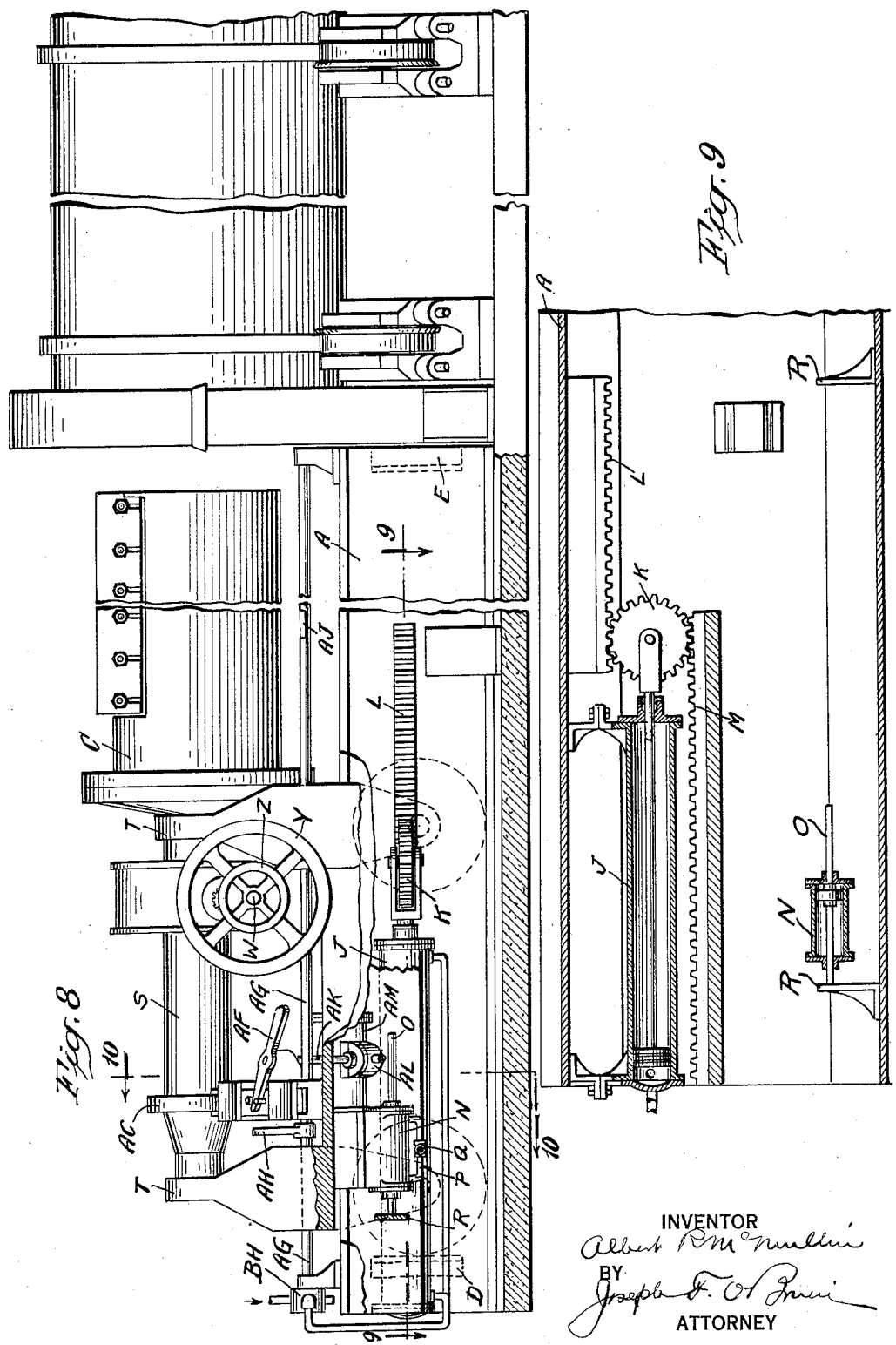

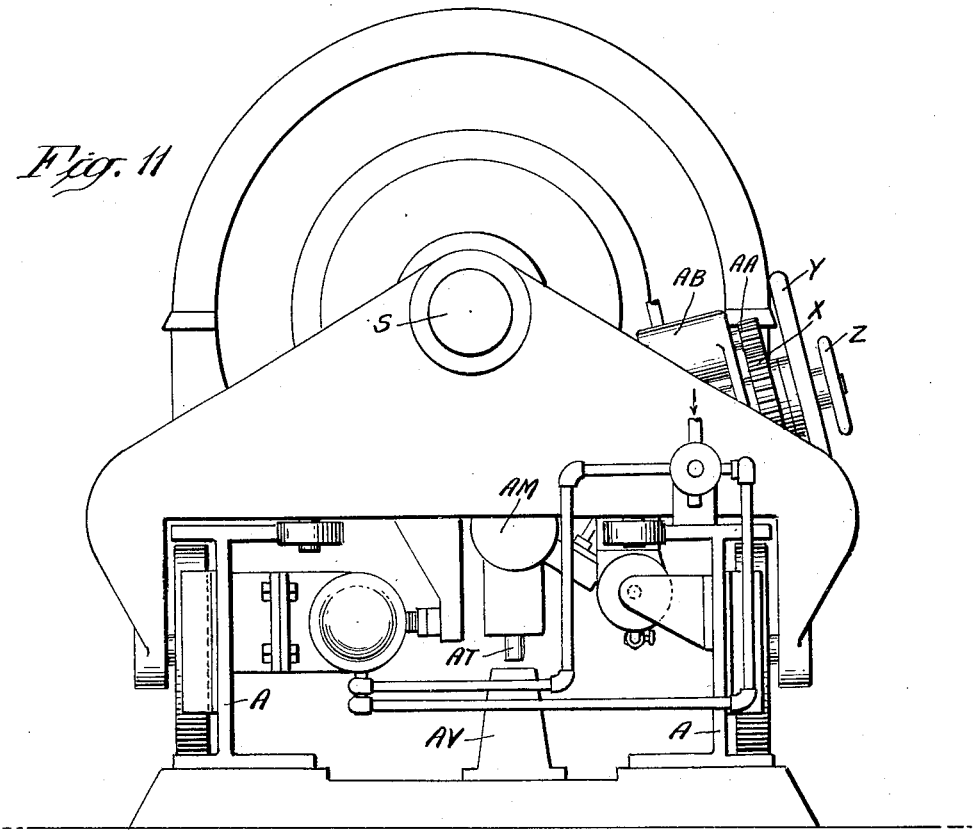
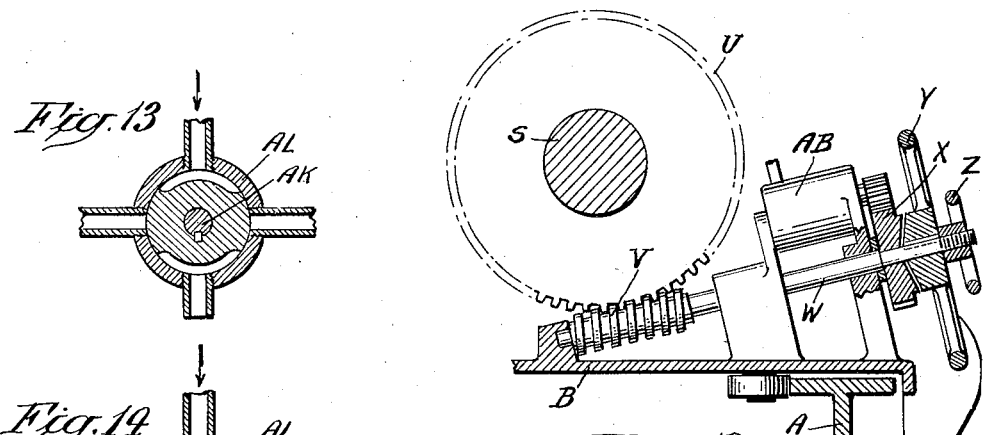

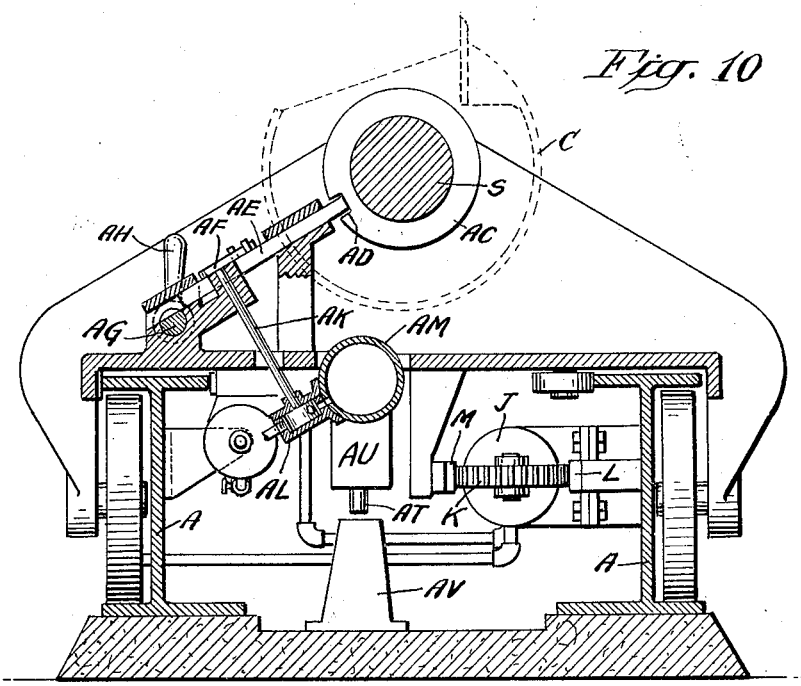
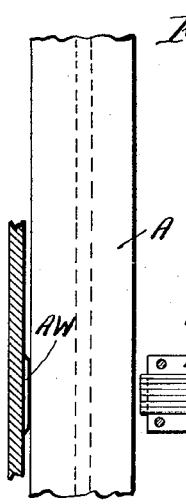
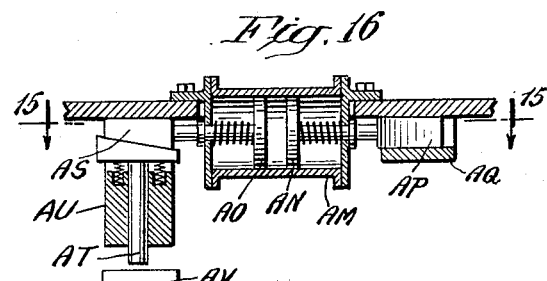
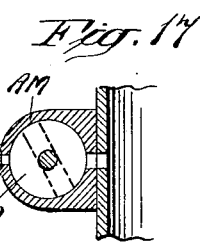
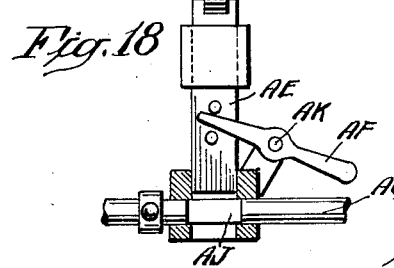

Patented Oct. 4, 1932

1,881,323

UNITED STATES PATENT OFFICE

ALBERT R. McMULLIN, OF NEW YORK, N. Y.

POWER MECHANISM FOR OPERATING BUCKETS OF CENTRIFUGAL MOLDING APPARATUS

Application filed December 31, 1931. Serial No. 584,183.

This invention relates to improvements in power mechanism for operating buckets of centrifugal molding apparatus and constitutes an improvement on the type of apparatus disclosed in patents issued to Moir and Buchanan, No. 1,223,602, entitled "Manufacture centrifugally of hollow articles" dated April 24, 1917, and No. 1,286,056 entitled "Means or apparatus relating to the manufacture centrifugally of hollow articles" dated November 26, 1918.

Heretofore bucket operating mechanisms of centrifugal molding apparatus for concrete pipes have been moved by manual power and it is one of the objects of this invention to provide power mechanisms for traversing and rotating the bucket that will enable the bucket in a machine of the type specified to serve its various functions including the carrying of the concrete to the interior of the mold, the dumping of the concrete within the mold and the movement of a blade carried by the bucket to compact and finish the interior of the pipe, and will cause faster movements of the bucket to be procurable with consequent speedier operations of the machine.

Other objects of my invention are to provide power mechanism for positive control of the traversing movement of the bucket carriage; to provide power mechanism that will enable proper traversing movement of the bucket carriage to be accomplished; to provide control means for the carriage-traversing mechanism including a control valve capable of manual control by an operating lever; to provide stops and bumpers in connection with the traversing mechanism to take up shock and slowly to bring the carriage to rest at the ends of the traversing movement; to provide a double-acting bumper mechanism which during its bumping and shock absorbing action at one end of the traversing movement will be automatically set for engaging and absorbing shock at the opposite end of the traversing movement; to provide a traversing mechanism embodying a power-traversed piston mechanism having a piston traversed pinion cooperating with a stationary rack secured to a rail and a movable rack secured to the carriage to cause the carriage to be moved double the distance travelled by the piston-traversed pinion.

Still other objects of my invention are to provide for rotation of the bucket by a power element carried by the carriage; to provide a simple power-actuated mechanism by which the bucket may be rotated in either direction at suitable speeds which may be readily and quickly varied and are under complete control; to provide means whereby the bucket may be partially rotated by hand without stopping the movement of the power element; to enable the saving of both time and manual labor in the operations requiring rotation of the bucket.

Still other objects of my invention are to provide mechanism for maintaining the bucket in a predetermined position and preventing the bucket being rotated while the same is being traversed to enter or to be withdrawn from the mold. It being understood that the bucket is mounted eccentrically of the pipe mold, it will be evident that in certain positions of rotation the blade carried by the bucket will make contact with and may even cut deeper than the finished surface of the pipe and consequently the bucket and blade cannot in such positions be freely traversed to enter the mold or to be withdrawn therefrom without fouling the former rings in the mold and that the best position of the bucket for an insertion into and withdrawal from the mold is that in which the bucket is rotated to cause the mouth of the same to be disposed upwardly to receive and retain the concrete and to permit the blade or trowelling member to enter the mold without such fouling; to provide a simple locking mechanism operable in bucket engaging position to lock the bucket in a predetermined anti-fouling position and in disengaged position to lock the control element of the traversing mechanism against movement, thus preventing any traversing of the bucket until the locking member is in engaging position and the bucket is consequently in a predetermined rotational position and similarly when in engagement with the control element disengaging the bucket and permitting rotating thereof to discharge concrete and to trowel the inner surface etc. during which operations the locking element will engage the traverse controlling member and prevent any traverse of the bucket; to provide against accidents which have heretofore occurred by the bucket being brought into contact with a part of the revolving mold; to produce improved operating conditions and to improve the quality of the pipes made by the machine.

Still another object of my invention is to provide means operable to hold the bucket carriage rigid during the trowelling operations with the smoothing blade carried by said bucket.

With these and other objects in view, the invention comprises the combination of members and arrangement of parts so combined as to co-act and cooperate with each other in the performance of the functions and the accomplishment of results herein contemplated, and comprises in one of its adaptions the species or preferred form illustrated in the accompanying drawings, in which:—

Fig. 1 is a view in side elevation of a machine embodying my invention;

Fig. 2 is a sectional view through a mold and bucket showing the position of the bucket with respect to the mold upon entering the latter;

Fig. 3 is a similar cross-section after concrete in the bucket has been dumped and centrifuged in the mold;

Fig. 4 is a similar section of the position of the bucket during the trowelling or smoothing operation;

Fig. 5 is a section on the line 5—5 through the bucket rotating mechanism, certain parts beneath the carriage being omitted;

Fig. 6 is a section on the line 6—6 through the alternate interengaging and locking mechanism between the bucket shaft and traverse controlling mechanism;

Fig. 7 is a section on the line 7—7 of Fig. 1 showing the mold rotating mechanism;

Fig. 8 is an enlarged view partly in side elevation and partly in section illustrating the bucket traversing mechanism;

Fig. 9 is a section on the line 9—9 of Fig. 8 looking in the direction of the arrow;

Fig. 10 is a section on the line 10—10 of Fig. 8 looking in the direction of the arrow;

Fig. 11 is an end elevation of the machine shown in the preceding figures of the drawings;

Fig. 12 is a view similar to Fig. 5 showing the rotating mechanism released from power control to permit hand operation;

Figs. 13 and 14 are vertical sections showing varying conditions of the traverse control valve shown in Fig. 8;

Fig. 15 is a view partly in plan and partly in section on the line 15—15 of Fig. 16, showing the carriage steadying jack and locks preferably operated by me during the operation of trowelling;

Fig. 16 is a section on the line 16—16 of Fig. 15 looking in the direction of the arrow;

Fig. 17 is a cross-section of the valve shown at the side of the cylinder in Fig. 15;

Fig. 18 is an enlarged detail showing alternate locking and releasing for the traverse controlling element and the bucket against rotating movement.

Referring now to these drawings, which illustrate a preferred embodiment of my invention, it will be understood that the bucket of a machine of the type specified serves several purposes, viz: it carries concrete to the interior of the mold, it carries the blade or trowel which compacts the concrete and finishes the interior surface of the pipe and it forms a reservoir for the excess water collected from the interior of the pipe. To fulfill these needs, it is made rotatably with its supporting shaft mounted on a carriage traversible on suitable rails.

*The bucket-traversing mechanism*

Heretofore the bucket carriage B has been moved along tracks A by manual power. The following is a method of moving or traversing the carriage by power.

I attach to the inside of one carriage rail A an air cylinder J to the piston of which is attached a toothed or gear wheel K. This wheel engages on one side with toothed rack L attached rigidly to the inside of rail A while on the other side it engages with toothed rack M attached to the underside of the carriage B. The racks L and M and the cylinder and its piston are of such lengths as to give a complete traverse of the carriage from the "in" to the "out" position or vice versa.

In operation the toothed wheel uses the rack L as a fulcrum and rack M as the part to be moved. By this arrangement the carriage is moved double the distance travelled by the toothed wheel.

Movement is controlled by operating lever AH which in turn revolves control rod AG connected to air valve BH. At will, compressed air is allowed to pass through the valve to the cylinder J and movement of the carriage obtained in the desired direction.

In order that the carriage wheels may not bump with great force against the stops D or E, a hydraulic or oil bumper is provided to take the shock and slowly bring the carriage to rest at the ends of the traverse. The arrangement consists of a cylinder N attached to the carriage which cylinder is fitted with a piston rod O extending and free to slide through both ends of the cylinder. Fixed to the piston rod is a piston or plunger of a lesser diameter than the internal diameter of the cylinder. A pipe or passage-way connection P is made between the two ends of the cylinder through which may flow the contained liquid of the cylinder. On this pipe or passage-way is located a valve Q to regulate the speed of flow.

The cylinder is completely filled with water, oil, or other suitable liquid.

When the carriage is nearing the completion of a traverse in either direction, the end of the piston rod O contacts with stop R, of which there is one suitably fixed to the inside of rail A at either end of the traverse and the plunger is forced through the cylinder. The liquid by-passes from one side of the plunger to the other through pipe P. By adjusting valve Q the rate of stopping the moving carriage may be controlled. The carriage having completed a traverse in one direction, the piston rod is now protruding a sufficient distance through the other end of the cylinder to make correct contact with stop R when the carriage is traversed in the opposite direction. In this way the bumper becomes automatic.

*The bucket rotating mechanism*

Heretofore, it was rotated by manual effort but the following is a method of rotating by power, which power may be compressed air, water under pressure, electricity or power of other source.

The bucket C is attached by bolted flanges to shaft S which rotates in bearings T. This shaft carries a worm gear U which engages with a worm V set on shaft W. Shaft W rotates in suitable bearings and also carries gear X, hand-wheel Y and hand-wheel Z. Gear X may be free to rotate on shaft W while hand-wheel Y is loose keyed to the shaft. A friction clutch effect exists between the gear and the hand-wheel. Hand-wheel Z is threaded on the shaft. By tightening on hand-wheel Z the hub of hand-wheel Y is tightened to the hub of the gear X. In this way if gear X is driven it may rotate shaft W or it may rotate free and not drive the shaft according as to whether wheel Z is tight or slack. Meshing with gear X is pinion AA mounted on the shaft of an engine AB which is suitably supported on the carriage.

To rotate the bucket the engine is set in motion, pinion AA drives gear X which in turn drives hand-wheel Y which drives shaft W and worm V. Worm gear U, and consequently bucket C, are thereby rotated.

By the introduction of a clutch effect between gear X and wheel Y, the bucket may be rotated by power or hand, as may be desired.

*Locking device for controlling bucket rotation, etc.*

The bucket being eccentric to the pipe mold it is evident that since in a certain position of rotation the bucket blade or trowel makes contact with, and may even cut deeper than, the finished surface of the pipe, it cannot be entered into or withdrawn from the mold in all positions of rotation without fouling the mold former rings. The best position is that in which the mouth of the bucket is upwards to receive and retain the concrete and yet the blade or trowel will not foul the mold former ring.

The following is a device for holding the bucket in a certain position and preventing its being rotated while entering or being withdrawn from the mold.

On bucket shaft S is a ring AC having a notch AD. A sliding bolt AE is so arranged that it may be moved in or out of the notch by operating handle AF. When the bolt is in the "out" position, its lower or outer end passes through a gap cut across the carriage-movement control rod AG, thereby preventing its rotation. A similar gap AJ in the control rod is located so that it is opposite the sliding bolt when the carriage is in the "in" position.

*To operate.*—In order that the bucket may be free to rotate to discharge water or receive concrete, the bolt is withdrawn from notch AD. The bolt has passed into gap in control rod AG thereby preventing its rotation and consequently any traverse of the carriage. In a similar manner when the carriage is at the "in" position, the bolt is withdrawn passing into gap AJ in the control rod thereby allowing the bucket to be rotated to discharge concrete, trowel, etc. Meantime the carriage cannot be moved since the bolt prevents control rod AG being rotated.

In conjunction with this lock—or the operation may be distinctly separate—is a device for holding the carriage rigid during trowelling operations.

Keyed to hand lever AF is a rod or shaft AK connected to a control valve AL. From valve AL is an air pipe connection to cylinder AM, the connection entering at a central point of the cylinder. Within the cylinder are two pistons AN and AO connected to piston rods which pass through the cylinder heads. Attached to the rod of piston AN is a wedge shaped block AP which makes contact with bolt AQ one end of which is wedged similarly to block AP. The outer end of the bolt can make contact with the inside face of the top flange of rail A. Bolt AQ fits into and can slide in housing AR. On the side of the carrige frame opposite the end of bolt AQ, but on the other side of rail, is a pad or raised portion AW which slides easily against the outside face of the top flange of rail A.

From piston AO is a piston rod terminating in wedge shaped block AS which makes contact with a similarly wedged face of bolt AT contained in housing AU. On the "in" position of the carriage bolt AT can make

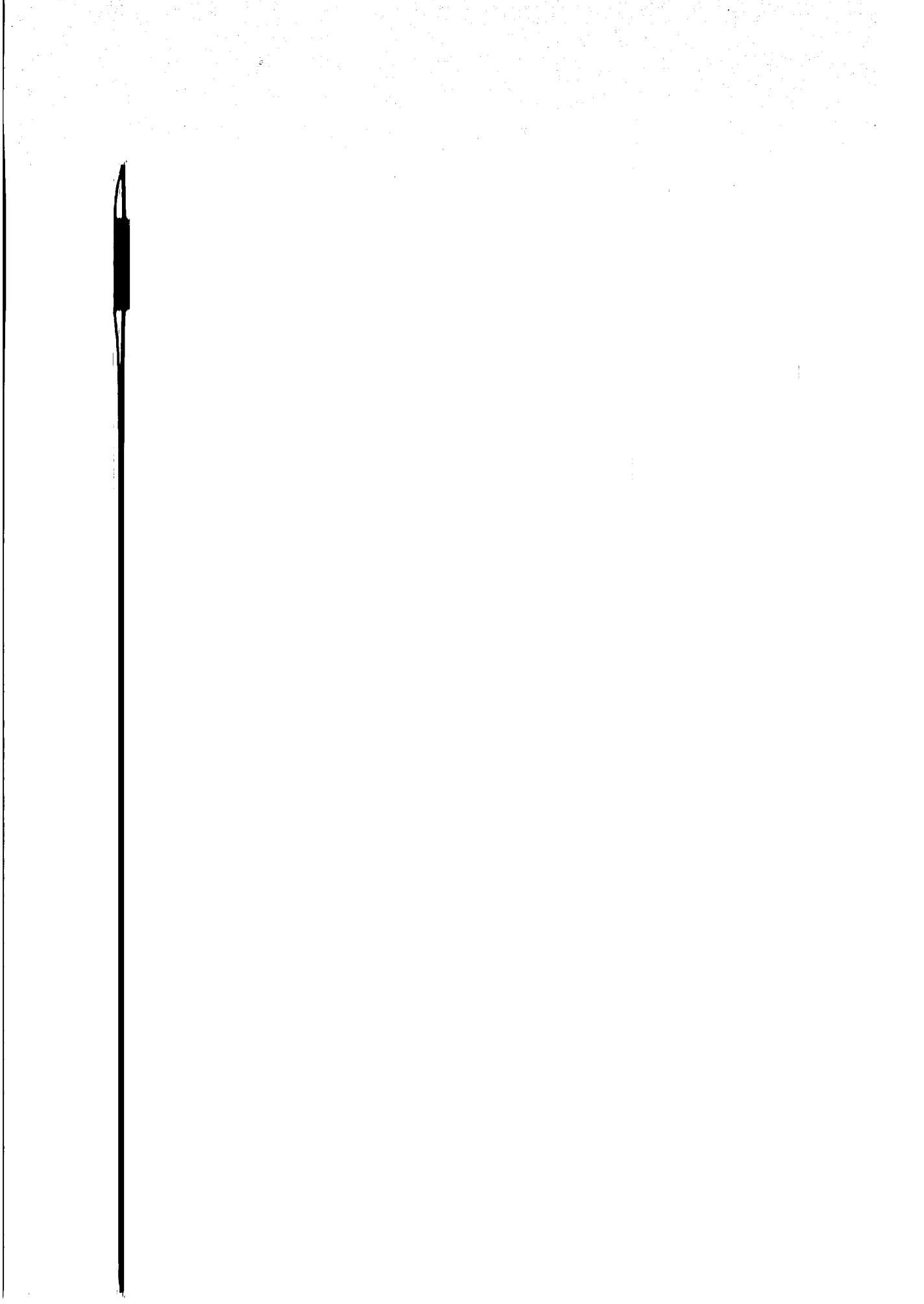

comprising a power actuated element, means for supplying power for said element to cause the same to be moved in opposite directions, means for providing an operative connection between said carriage and power element to traverse the carriage in opposite directions, power-actuated mechanism for rotating said bucket, said bucket-rotating mechanism being provided with means to permit manual rotation without stopping movement of the power-rotating means.

7. Centrifugal molding apparatus for concrete pipes and the like embodying, in combination, a mold and means for spinning the same, a bucket and a carriage on which said bucket is rotatably mounted, means for traversing said bucket into and out of the mold comprising a power actuated element, means for supplying power for said element to cause the same to be moved in opposite directions, means for providing an operative connection between said carriage and power-actuated element to traverse the carriage in opposite directions and jack means associated with said carriage for steadying and holding the same rigid during trowelling operation of the bucket.

In witness whereof, I have signed my name to the foregoing specification.

ALBERT R. McMULLIN.